United States Patent [19]

Lindén

[11] Patent Number: 5,526,571
[45] Date of Patent: Jun. 18, 1996

[54] PIVOTED TOOL WITH FOLDABLE HANDLES

[75] Inventor: Erkki O. Lindén, Billnäs, Finland

[73] Assignee: Fiskars Oy Ab, Helsinki, Finland

[21] Appl. No.: 347,559

[22] Filed: Nov. 29, 1994

Related U.S. Application Data

[63] Continuation-in-part of Ser. No. 217,916, Mar. 25, 1994, Pat. No. 5,426,857, which is a continuation-in-part of Ser. No. 23,811, Feb. 26, 1993, Pat. No. 5,325,857, which is a continuation-in-part of Ser. No. 986,057, Nov. 30, 1992, Pat. No. 5,341,573.

[51] Int. Cl.⁶ .................................................. B26B 13/00
[52] U.S. Cl. ................................................ 30/255; 76/106.5
[58] Field of Search ............................. 30/161, 254, 255, 30/262; 76/106.5

[56] References Cited

U.S. PATENT DOCUMENTS

| | | |
|---|---|---|
| 858,003 | 6/1907 | Klever . |
| 1,370,906 | 3/1921 | Newton . |
| 1,461,270 | 7/1923 | Garrison . |
| 1,524,694 | 2/1925 | Di Maio ............................ 30/225 |
| 2,106,584 | 1/1938 | Whiting . |
| 2,126,699 | 8/1938 | Florian ............................. 30/161 |
| 2,952,912 | 9/1960 | Crawford . |
| 3,735,763 | 5/1973 | Shannon et al. ................... 30/254 |
| 3,750,282 | 8/1973 | Eaton et al. ...................... 30/254 |
| 4,534,109 | 8/1985 | Bush et al. ....................... 30/254 |
| 4,555,822 | 12/1985 | Miceli . |
| 4,715,122 | 12/1987 | Linden ............................ 30/254 |
| 4,744,272 | 5/1988 | Leatherman . |
| 5,062,173 | 11/1991 | Collins et al. . |
| 5,325,592 | 7/1994 | Linden et al. ..................... 30/254 |
| 5,341,573 | 8/1994 | Linden et al. ..................... 30/254 |

Primary Examiner—Hwei-Siu Payer
Attorney, Agent, or Firm—Foley & Lardner

[57] ABSTRACT

A pivoted tool with foldable handles, such as a pair of scissors, includes a pair of opposed elongated members, each member comprising a jaw at a front end portion thereof, a handle at a rear end portion thereof, and a midportion where the members cross over each other. A pivot unites the midportions for scissor-like movement of the handles and jaws about the pivot. According to the invention, each member includes a metal plate having a forwardly extending blade which comprises one of the jaws and a rearwardly extending tang. The foldable handles and pivot are made of a moldable material molded onto the metal plate, such that the handles are molded onto the tang of the metal plate and the pivot extends through a central hole in the metal plate. The moldable material is most preferably a plastic, but other moldable substances could be employed.

24 Claims, 4 Drawing Sheets

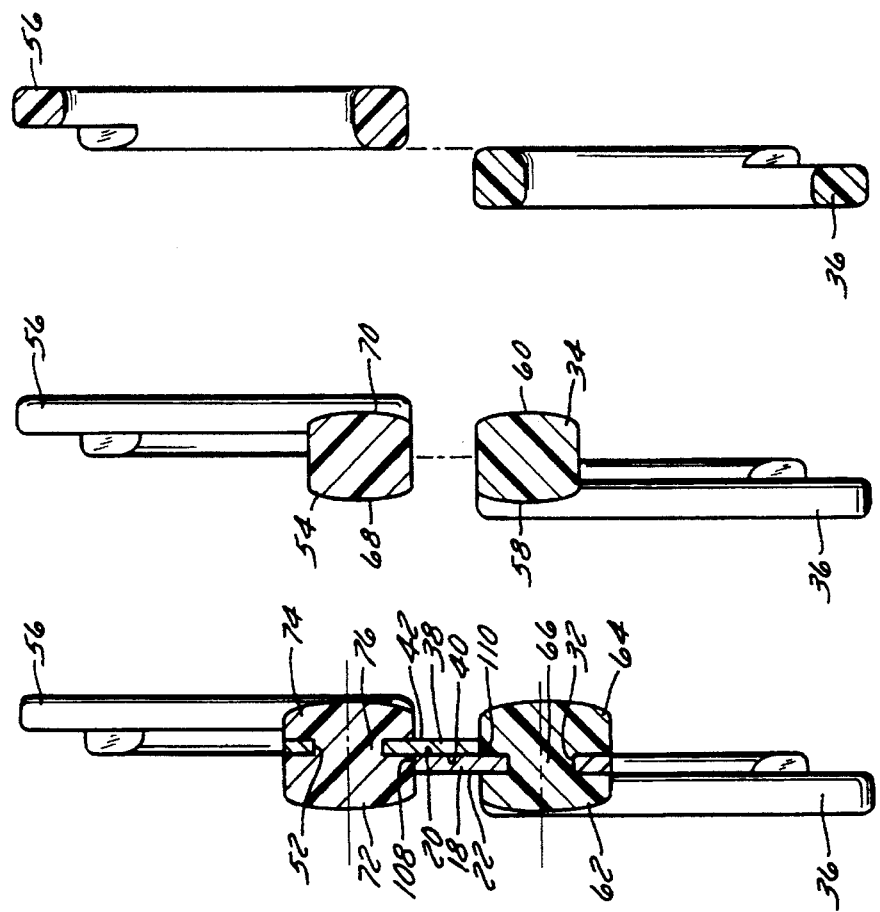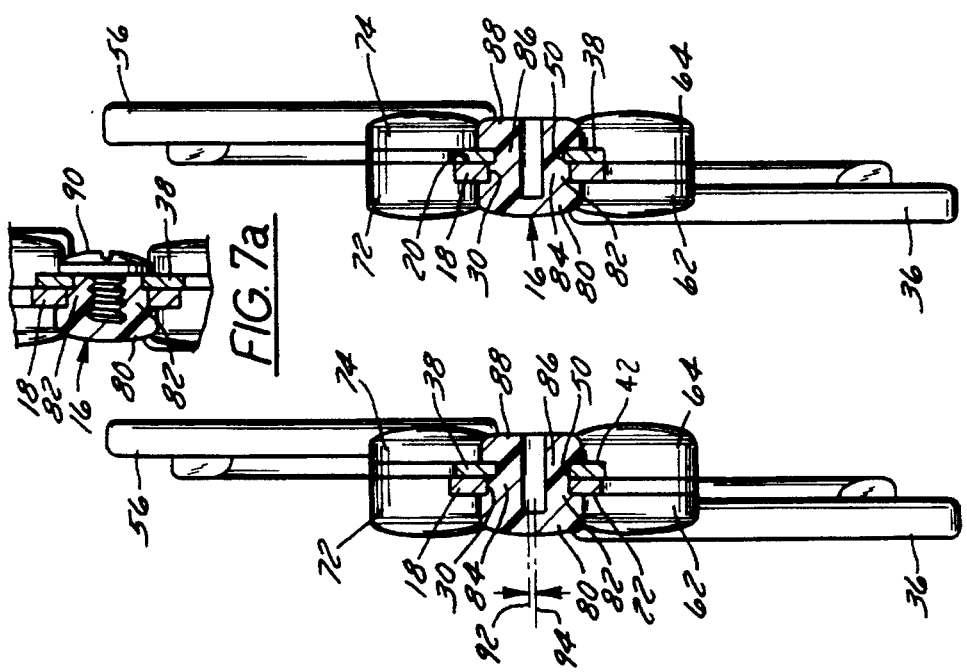

PIVOTED TOOL WITH FOLDABLE HANDLES

CROSS-REFERENCE TO RELATED APPLICATIONS

This is a continuation-in-part application of U.S. patent application Ser. No. 08/217,916, filed Mar. 25, 1994 having issued on Jun. 27, 1995 as U.S. Pat. No. 5,426,857; which is a continuation-in-part application of U.S. patent application Ser. No. 08/023,811, filed Feb. 26, 1993, which issued on Jul. 5, 1994 as U.S. Pat. No. 5,325,592; which is a continuation-in-part application of U.S. patent application Ser. No. 07/986,057, filed Nov. 30, 1992, which issued on Aug. 30, 1994 as U.S. Pat. No. 5,341,573.

FIELD OF THE INVENTION

The present invention relates generally to tools with foldable handles, such as scissors.

BACKGROUND OF THE INVENTION

Pivoted implements having elongated members disposed for cooperative engagement about a pivotable joint are widely used. For convenience or to prevent injury to the user, some of these tools are provided with foldable handles so that the tool can be folded into a safe compact assembly when not in use. Prior art foldable tools generally comprise two elongated members, typically made of stamped or forged metal or other suitable material, disposed for cooperative engagement about the pivotable joint such as a screw or bolt arrangement. Typically, each member includes a jaw, having a working end and an opposed tang, and a handle conforming to the fingers or hands of the user. The handles are pivotally connected to the tang such that the jaws or blades are protectively nested within the handles when the handles are folded about the tangs.

Foldable pivoted tools of the type disclosed in the prior art are generally made entirely of metal. These items typically comprise various components requiring several distinct manufacturing steps followed by the assembling of subassemblies and the adjustment of pivoted parts for suitable operation. Examples of such foldable tools are described in U.S. Pat. No. 2,952,912, issued to Crawford on Sep. 20, 1960; U.S. Pat. No. 1,370,906, issued to Newton on Mar. 8, 1921; U.S. Pat. No. 1,461,270, issued to Garrison on Jul. 10, 1923; and U.S. Pat. No. 858,003, issued to Klever on Jun. 25, 1907. Patents '912, '906 and '003 illustrate examples of folding scissors, while the '270 patent discloses a pair of pliers with foldable handles.

As can be seen from these prior art patents, the handles of these conventional tools are pivoted to the tangs in one of two ways. One approach, disclosed in Crawford, Klever, and Garrison, consists of having each handle pivoted to the corresponding tang about an axis parallel to the axis of the tool (e.g., 36 and 22 in Crawford). In those cases, however, to permit adequate scissor-action, it becomes necessary to immobilize the handles with respect to the tangs. This typically requires the use of leaf springs (e.g., 42 in Crawford or 19 in Garrison) coacting with suitably cammed surfaces of the tangs to releasably prevent relative movement of the handles and the jaws. When it is desired to store the item away, the user needs to overcome the force of the spring or disengage the spring from a mating recess to permit folding of the handles.

A second approach to prevent unacceptable movement of the handles with respect to the tangs is disclosed in Newton. As shown in FIG. 1 of Newton, the pivots of the handles and tangs are disposed at right angles with the main pivot of the tool. As can readily be appreciated, unlike in Crawford and Garrison, normal scissor-action of the handles will typically not tend to rotate the handles about the pivot of the tangs. However, even with such right-angle configuration, it is preferable to unite more positively the handles and the tangs to prevent accidental folding of the handles for example when the scissors are being positioned by the user with respect to the item to be cut. Newton discloses that this can be accomplished using a leaf spring 6 coacting with a corresponding tang. This results in additional components which eventually increase manufacturing cost and may necessitate periodic adjustments under normal use of the tool.

The limitations identified in the foregoing make apparent that prior art methods used to manufacture pivoted foldable tools, such as scissors or the like, have various disadvantages. These prior art methods typically require assembling two members such as a pair of blades which have been previously manufactured separately and installing various other components for appropriate operation of the foldable scissors, thereby increasing material handling requirements which generally translate into higher unit cost. Thus, it appears desirable to provide foldable pivoted tools such as scissors or the like which can alleviate the problems associated with conventional manufacturing methods. That is, it is desirable to engineer foldable tools so that they lend themselves to functional assembling during, as opposed to subsequent to, the manufacturing process, or that otherwise reduce the number of operations required to manufacture these tools, while maintaining or improving all features typically desired by users of these tools.

SUMMARY OF THE INVENTION

The present invention facilitates the manufacturing of pivoted tools with foldable handles by simplifying the manufacturing process and eliminating secondary assembly operations typically required with such pivoted implements, and by improving, or at least maintaining, the functional quality of these tools. A method for making a foldable pivoted tool in accordance with the invention is characterized in that two metal plates each including a jaw are disposed in separate cavities of a mold to which an uncured or otherwise flowable polymer, copolymer or the like is supplied, as by injection, to form the foldable handles at the tang end of the jaws. The flowable material is also preferably supplied to a third cavity of the mold forming the pivot uniting the two metal plates. Accordingly, tools in accordance with the invention can be constructed without requiring post manufacturing assembling and adjusting operations.

A pivoted tool with foldable handles according to one aspect of the invention includes a pair of opposed elongated members, each member comprising a jaw at a front end portion thereof, a foldable handle at a rear end portion thereof, and a midportion where the members cross over each other. A pivot unites the midportions for scissor-like movement of the handles and jaws about the pivot. According to a preferred embodiment of the invention, each of the members includes a metal plate having a forwardly extending blade which comprises one of the jaws and a rearwardly extending tang. The foldable handles and pivot are each made of a moldable material molded onto the metal plates, such that each handle is molded onto the tang of the respective metal plate, and the pivot extends through a central aperture in each of the metal plates. The moldable material is most preferably a plastic, but other moldable substances could be employed.

According to a further embodiment of the invention, in a pair of scissors having a pair of blades joined by a molded pivot, each of the blades is provided with an opening in the tang portion thereof, the foldable handles are molded onto the tangs through the openings. The pivot is molded in the same operation as the foldable handles.

According to another aspect of the invention, the pivot further includes a fastener. The fastener and pivot cooperate to permit functional adjustment of the tool.

A preferred method for making a foldable tool according to the invention includes the steps of positioning two metal plates having a forwardly extending blade which comprises the jaws and a rearwardly extending tang into a mold, then molding the foldable handles and pivot onto the metal plates using a moldable plastic, such that each handle is molded onto the tang of the respective metal plate to form the elongated member, and the pivot extends through a central aperture in each of the metal plates.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 7 is a sectional view taken along line 7—7 shown in FIG. 5 with the apertures in the blades shown in misalignment;

FIG. 7a is a partial sectional view taken along line 7—7 shown in FIG. 5 with the pivot comprising a fastener;

FIG. 7b is a sectional view taken along line 7—7 shown in FIG. 5 with the apertures in the blades shown in alignment;

FIG. 8 is a sectional view taken along line 8—8 shown in FIG. 5;

FIG. 9 is a sectional view taken along line 9—9 shown in FIG. 5;

FIG. 10 is a sectional view taken along line 10—10 shown in FIG. 5;

DETAILED DESCRIPTION OF A PREFERRED EXEMPLARY EMBODIMENT

The invention relates to pivoted tools with foldable handles having a pair of elongated members disposed for cooperative engagement about a pivot wherein a force supplied to the force-applying end of the tool is transmitted through the pivot to the opposed working end of the elongated members and transferred to an item engaging the working pieces or jaws. Accordingly, the terms "scissors" as used herein from time to time should also be understood to connote other types of pivoted tools such as pliers, shears, nippers, etc., while the use of the term "plastic" handles and "plastic" pivot further comprehends similar materials including, for example, ceramic or other suitable material which can be utilized to form the handles disposed at the force applying end of the pivoted tool and to form the pivot member. In this vein, those skilled in the art will further appreciate that the device described herein and its principle of operation, as well as the method described herein for manufacturing such items and its principles of implementation, is broadly applicable to a wide variety of pivoted implements generally, and may be adapted to tools other than scissors. Accordingly, while the present invention is hereinafter described with particular reference to a pair of scissors, the skilled artisan will note its many other applications.

Figure 1:
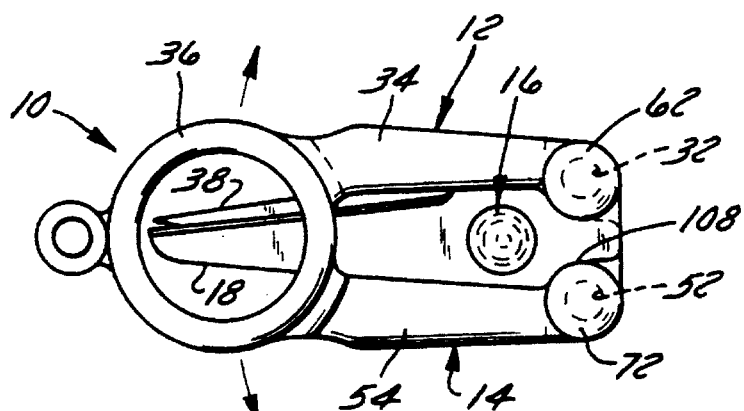
FIG. 1 is a top plan view of a pair of foldable scissors in accordance with one aspect of the invention, with the scissors shown in the completely folded configuration.
Figure 2:
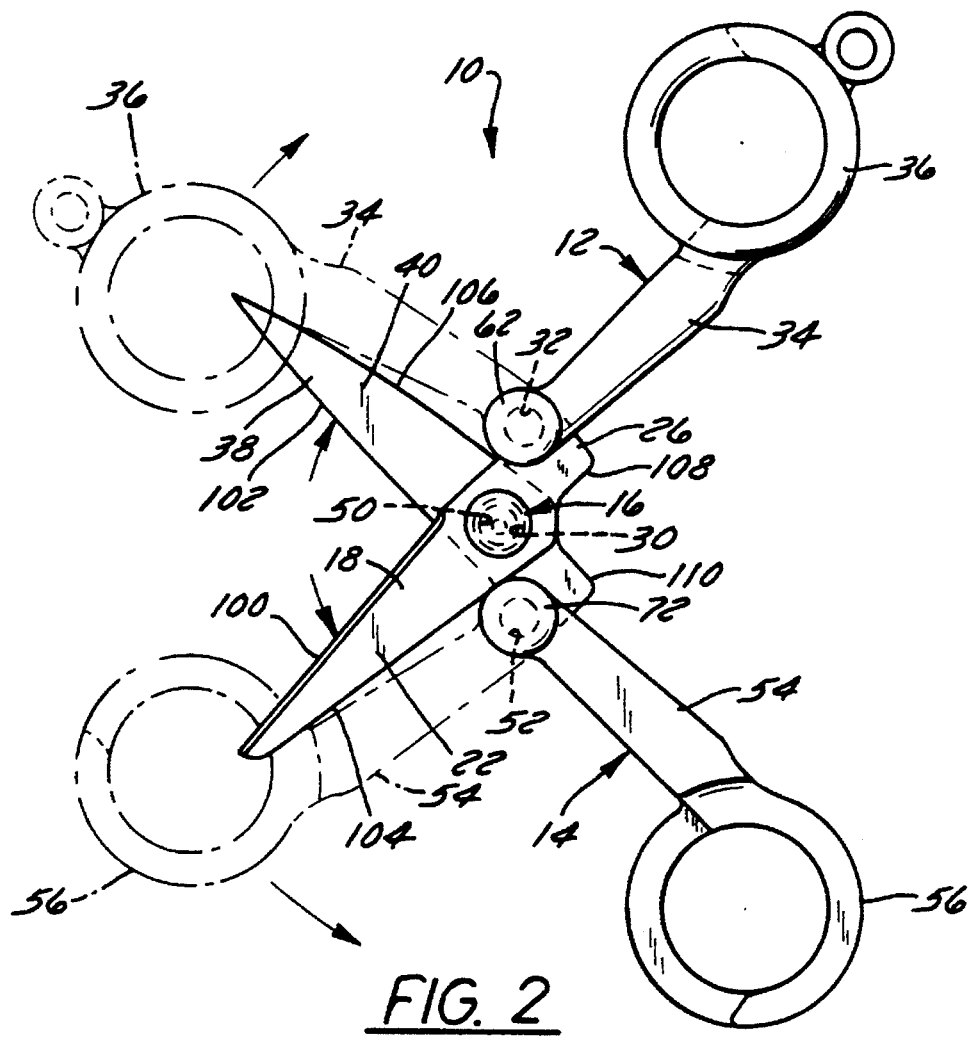
FIG. 2 is a top plan view of the pair of scissors of FIG. 1 shown with unfolded handles and the blades in the open position.
Figure 3:
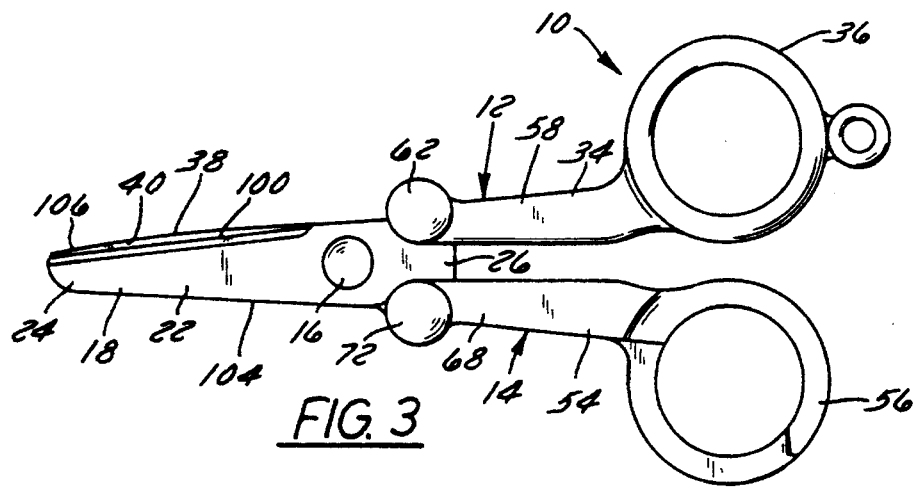
FIG. 3 is a top plan view of the pair of scissors of FIG. 1 shown with unfolded handles and the blades in the closed position.
Figure 4:
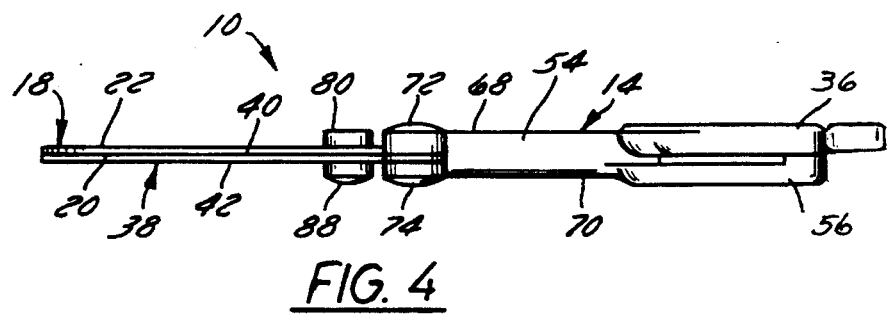
FIG. 4 is a front elevational view of the scissors of FIG. 3.
Figure 5:
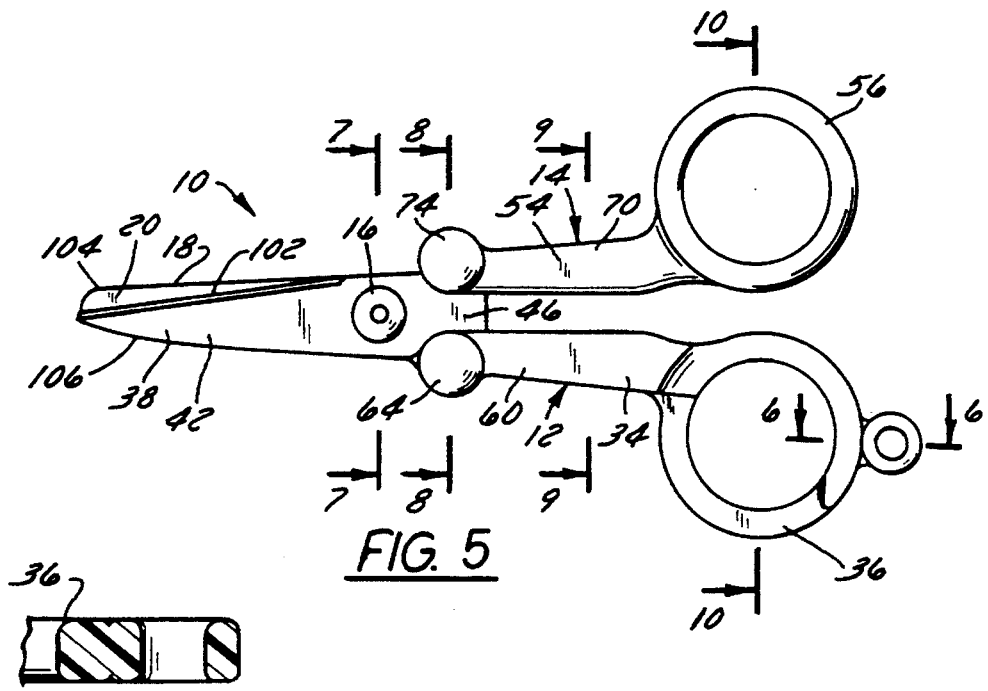
FIG. 5 is a bottom plan view of the scissors of FIG. 3.
Figure 6:
FIG. 6 is a partial sectional view taken along line 6—6 shown in FIG. 5.
Figure 11:
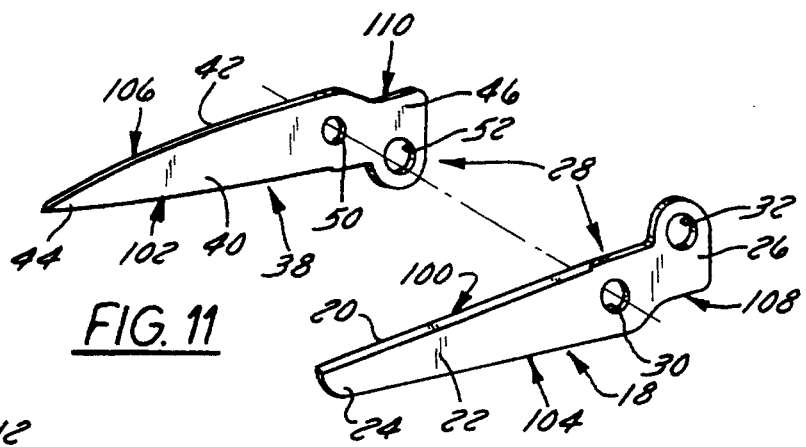
FIG. 11 is a perspective view of the metal plates used with the scissors shown in FIG. 1.
Figure 12:
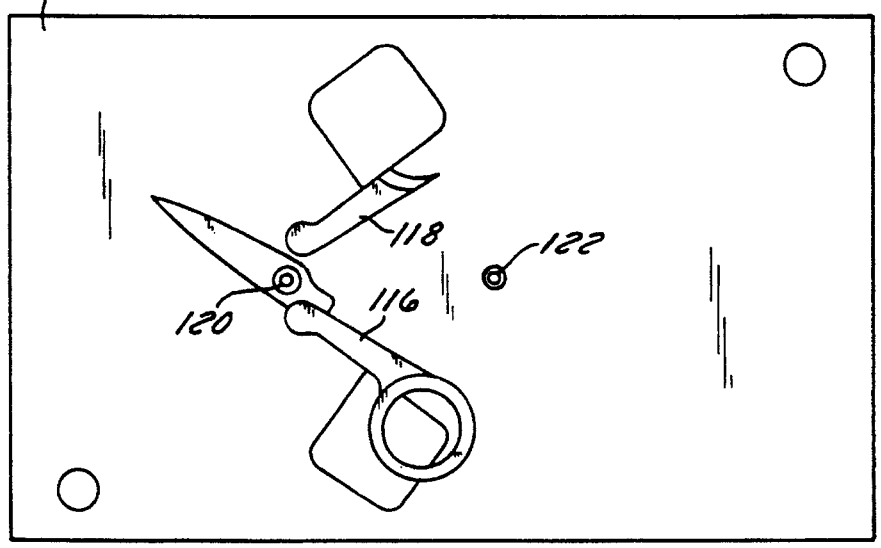
FIG. 12 is a top plan view of one half of a mold for the manufacture of the scissors shown in FIG. 1.
Figure 13:
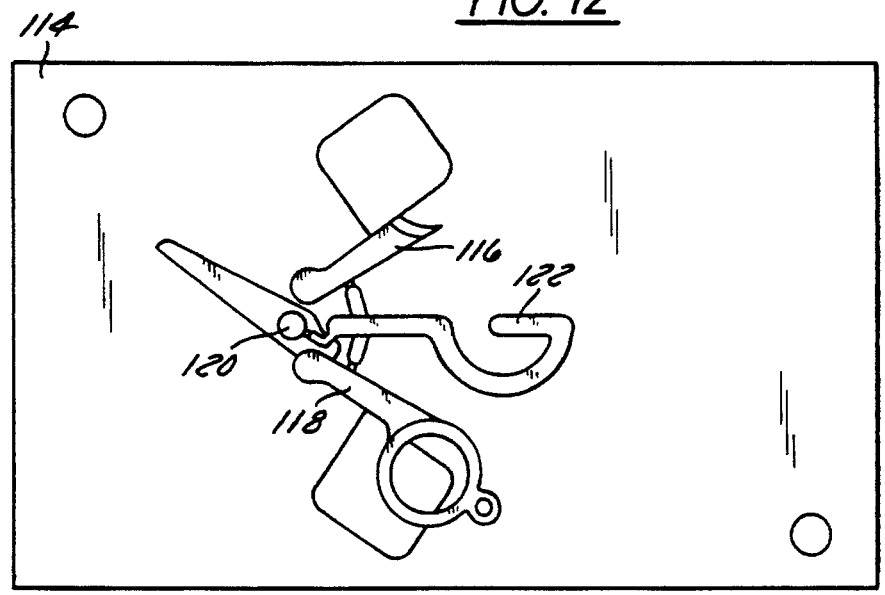
FIG. 13 is a top plan view of the other half of the mold for the manufacture of the scissors shown in FIG. 1.

Referring to the Figures, a pair of scissors 10 according to the invention includes first and second elongated members 12 and 14, respectively, joined for scissor action about a pivot 16. Referring more particularly to FIGS. 2 and 11, elongated member 12 includes a steel plate 18 having an inner face 20 and a spaced outer face 22. Plate 18 comprises a first jaw 24 in the form of a cutting blade, an opposed force-applying end or tang 26, and a midportion or pivot region 28 intermediate jaw 24 and tang 26. Plate 18 is provided with a central first aperture 30 formed therein and with a first opening 32 through tang 26. Elongated member 12 also comprises a first handle 34 molded into engagement with tang 26, and terminating by a loop 36.

Similarly, second elongated member 14 includes a steel plate 38 having an inner face 40 and a spaced outer face 42. Plate 38 comprises a first jaw 44 in the form of a cutting blade, an opposed force-applying end or tang 46, and a midportion or pivot region 28 intermediate jaw 44 and tang 46. Plate 38 is provided with a central second aperture 50 formed therein and with a second opening 52 through tang 46. Elongated member 14 also comprises a second handle 54 molded into engagement with tang 46, and terminating by a loop 56.

Referring more particularly to FIGS. 3, 5, 7, and 8, handles 34 and 54 are molded onto plates 18, 38 at tangs 26, 46. First handle 34 comprises upper and lower surfaces 58, 60 terminating at tang 26 in respective upper and lower regions 62, 64, molded onto outer face 22 and inner face 20. Upper region 62 is joined to lower region 64 by a first shank 66 passing through opening 32. Similarly, second handle 54 comprises upper and lower surfaces 68, 70 terminating at tang 46 in respective upper and lower regions 72, 74, molded onto inner face 40 and outer face 42. Upper region 72 is joined to lower region 74 by a second shank 76 passing through opening 52. Because shanks 66 and 76 are formed in situ, i.e., within mold cavities receiving plates 18 and 38, shanks 66 and 76 extend through openings 32, 52, respectively, into close conforming engagement thereto.

As is well known in the art of molding, and in particular in the art of molding polymers or copolymers, the cooling phase of conventional molding processes typically results in a shrinkage of the shapes being molded. The present invention advantageously utilizes this attribute in two ways. First, shrinkage of shanks 66 and 76 in the direction of the diameter of these shanks (i.e., in a direction perpendicular to the pivot axis of the handles and the tangs) provides necessary functional clearance between shanks 66, 76, and openings 32, 52, respectively, thereby allowing shanks 66 and 76 to rotate within openings 32, 52. Second but conversely, shrinkage of shanks 66 and 76 in the longitudinal direction of these shanks (i.e., along the pivot axis of the handles and the tangs), brings upper region 62 closer to lower region 64, and similarly region 72 closer to region 74. Such shrinkage, which the inventor has observed is in the order of approximately 1% of the distance between oppositely facing upper and lower regions, provides necessary and sufficient friction between upper region 62 and outer face 22, between lower region 64 and inner face 20, between upper region 72 and inner face 40, and between lower region 74 and outer face 42. Thus, shrinkage of shanks 66 and 76 both in the direction of the axis of the pivot of the handles and the tangs, and in the direction normal to that axis, generates required functional clearance and friction in the articulation of handles 34, 54 and tangs 26, 46 for suitable operation of folding scissors 10, i.e, permitting a user to fold the handles of these scissors without inordinate effort, while allowing proper operation of the scissors.

Referring more particularly to FIGS. 2, 3, 5 and 11, metal plates 18 and 38 comprise cooperative working surfaces 100, 102, and oppositely facing rear surfaces 104, 106, respectively. Rear surfaces 104, 106 include an abutment face 108, 110, at tangs 26, 46. When blades 18, 38 are in closed configuration, lower region 64 of handle 34 comes into engagement with abutment face 110 of blade 38, and upper region 72 of handle 54 comes into engagement with abutment face 108 of blade 18. To permit a user of tool 10 to fold handles 34 and 54 while keeping blades 18, 38 in closed configuration, the contour of abutment face 108 is complementary to that of upper region 72 and the contour of abutment face 110 is complementary to that of lower region 64. In other words, to permit conformance of regions 64 and 72 to abutment faces 110, 108 (i.e., to permit regions 64 and 72 to remain in engagement with faces 110, 108) throughout the folding of handles 34, 54, openings 32 and 52 must be appropriately centered with respect to regions 64 and 72.

Referring more particularly to FIGS. 1, 3, 5, and 10, loops 36 and 56 are configured so that when handles 34, 54 are folded over blades 18 and 38, blades 18 and 38 are nested between upper surface 58 of first handle 34 and lower surface 70 of second handle 54.

Turning now to the pivot region of scissors 10 and referring more particularly to FIGS. 5, 7, 7a, and 7b, as with shanks 66 and 76, pivot 16 is similarly formed in situ. Pivot 16, comprises a first head 80 lying in contact with outer face 22 and merging into a post 82 having a first portion 84 extending effectively from outer face 22 to inner face 20 through aperture 30 into close conforming engagement to aperture 30. Post 82 also comprises a second portion 86 joined to first portion 84 and extending effectively from inner face 20 to outer face 42 through aperture 50 into close conforming engagement to aperture 50. Pivot 16 terminates in a second head 88 lying in contact with outer face 42.

In another embodiment of the invention as represented in FIG. 7a, second head 88 is replaced by a fastener 90 cooperating with first head 80 and post 82 to permit adjustment of the compressive force applied to blades 18 and 38. In either case, i.e., whether pivot 16 comprises fastener 90 or second head 88, as explained in U.S. Pat. No. 5,341,573 naming the present inventor and incorporated herein by reference, because pivot 16 is formed in situ, the center line 92 of aperture 30 and the center line 94 of aperture 50 need not be in precise alignment. This is because such misalignment will be self-compensated by corresponding misalignment of portions 84 and 86 conforming to apertures 30 and 50, respectively.

The invention is also directed toward a method for manufacturing pivoted tools having foldable handles and preferably also a pivot made of a moldable material. To manufacture scissors in accordance with the present invention, blades 18 and 38, having center apertures 30, 50 and openings 32, 52 at tangs 26, 46, are disposed in suitably shaped cavities of the two halves 112, 114 of a mold. A liquid material such as a plastic is fed to three cavities 116, 118, and 120. A feeding conduit 122 connects these cavities to a source of fluid material such as plastic or the like to form handles 34, 54, and pivot 16 in one molding operation. The mold may also be constructed to permit longitudinal displacement of the cavity used to form head 80 in response to a force applied longitudinally to head 88 of pivot 16. This step, if required, will establish the desired amount of preset functional clearance between head 80 and outer face 22. In the event fastener 90 is used with pivot 16, desired preset functional clearance will be created by appropriately loosening fastener 90 before removing scissors 10 from the mold.

A pivoted tool such as a pair of scissors according to the present invention can therefore be manufactured with improved facility, eliminating assembling, finishing, and adjusting operations typically required with tools manufactured in accordance with conventional methods. Thus, the manufacturing cost of tools in accordance with the present invention is noticeably reduced and consistency of appearance and functional characteristics of such tools are also favorably affected.

It is understood that the above description is of a preferred exemplary embodiment of the invention, and that the invention is not limited to the specific forms described. Those skilled in the art will appreciate that, for example, tools in accordance with the invention having foldable molded handles could comprise a pair of opposed jaws, as in needle nose pliers or fish hook pliers, instead of a pair of blades as described in the preferred embodiment. In such a case, the handles would have to have a configuration suitable to receive the jaws when the handles are folded over the jaws. Furthermore, handles 34, 54, molded onto tangs 26, 46 and foldable with respect thereto, could be pivoted along respective axes perpendicular to the axis of pivot 16, instead of parallel to that axis as described in the exemplary embodiment. Likewise, abutment faces 108, 110, and/or regions 62, 66 and 72, 76, of the handles, could have different configurations, or the pivoted tool could be provided without a molded pivot, in all cases without departing from the scope of this invention. Such other configurations and constructions are considered to be within the scope of this invention. Thus, these and other substitutions, modifications, changes and omissions may be made in the design and arrangement of the elements and in the manufacturing steps disclosed herein without departing from the scope of the appended claims.

I claim:

1. A pivoted tool with foldable handles, comprising:
   a pair of first and second opposed metal plates, each plate having a forwardly extending portion forming a jaw, a rearwardly extending tang, and an aperture intermediate the jaw and the tang to unite the plates at a pivot for scissor-like movement of the plates about the pivot; and
   a pair of first and second handles foldable about the tangs, the handles being made of a moldable material molded onto a respective one of the tangs each of the handles comprising a shank integrally formed therewith and projecting therefrom through and conforming to an opening in a respective one of the tangs, the handles being in frictional engagement therewith to permit the movement of the plates in response to scissors-like movement of the handles.

2. The tool of claim 1, wherein the moldable material is a plastic.

3. The tool of claim 1, wherein the forwardly extending portions are blades.

4. The tool of claim 1, wherein the forwardly extending portions are plier jaws.

5. The tool of claim 1, wherein the pivot is made of the moldable material, molded in the apertures.

6. The tool of claim 5, wherein each of the metal plates comprises spaced apart inner and outer faces, the inner face of one of the plates facing the inner face of the other of the plates, and wherein the pivot is formed of a unitary piece comprising a first head lying adjacent the outer face of the first plate, a post projecting from the first head into the apertures, the post terminating in a second head lying adjacent the outer face of the second plate.

7. The tool of claim 5, wherein the pivot further comprises a headed fastener received within the apertures for controlling a compressive force applied to said plates.

8. The tool of claim 7, wherein each of the metal plates comprises spaced apart inner and outer faces, the inner face of one of the plates facing the inner face of the other of the plates, and wherein the pivot is formed of a head lying adjacent the outer face of the first plate, a post merging from the head into the apertures and terminating at a point lying proximate but below the outer face of the second plate.

9. The tool of claim 1, wherein the aperture and the opening of the first plate have respective center lines generally normal to the first metal plate, and wherein the aperture and the opening of the second plate have respective center lines generally normal to the second metal plate.

10. The tool of claim 9, wherein the center lines of the apertures of the first and second plates are misaligned by an eccentricity amount but are in registration sufficient for the pivot to unite the plates, and wherein the pivot comprises a post having a first portion extending through and conforming to the aperture of the first plate, and a second portion extending through and conforming to the aperture of the second plate, each of the first and second post portions having an axis respectively coincident with the axis of the corresponding aperture, so that the axes of the post portions are misaligned by an amount substantially equal to the eccentricity amount.

11. The tool of claim 1, wherein each of the handles comprises oppositely facing and spaced apart upper and lower surfaces terminating at a tang end thereof in respective upper and lower regions, and wherein the shank of each of the handles joins the upper and lower regions thereof.

12. The tool of claim 11, wherein each of the metal plates comprises spaced apart inner and outer faces, the inner face of one of the plates facing the inner face of the other of the plates, and wherein the upper region of the first handle is molded onto the outer face of the first plate, the lower region of the first handle is molded onto the inner face of the first plate, and wherein the upper region of the second handle is molded onto the inner face of the second plate, and the lower region of the second handle is molded onto the outer face of the second plate.

13. The tool of claim 11, wherein each of the handles further comprises a loop at an end distal from the tang end.

14. The tool of claim 13, wherein the loops are configured so that, when the handles are folded over the jaws, the jaws are nested within the loops intermediate the upper surface of the first handle and the lower surface of the second handle.

15. The tool of claim 11, wherein each of the metal plates comprises a working surface and an oppositely facing and spaced apart rear surface, the rear surface of each of the plates having an abutment face at the tang end thereof so that, when the tool is in closed configuration, the lower region of the first handle comes into engagement with the abutment face of the second plate and the upper region of the second handle comes into engagement with the abutment face of the first plate.

16. The tool of claim 15, further wherein the abutment faces are contoured, the contour of each of the abutment faces being complementary to the shape of each of the regions so that, when the handles are being folded about the tangs, the lower region of the first handle is in conformance to the abutment face of the second plate and the upper region of the second handle is in conformance to the abutment face of the first plate, thereby permitting the handles of the tool to be folded while the tool remains in the closed configuration.

17. A foldable pivoted hand tool comprising:
   a pair of first and second metal plates each plate having oppositely facing inner and outer faces, a forwardly extending blade and a rearwardly extending tang;
   a pair of first and second foldable handles, the handles being made of a moldable material molded onto the inner and outer faces of the respective metal plate at the tang end thereof to form respective upper and lower regions of the handles; and
   a pivot molded onto the outer faces of the plates and into a central aperture in each of the plates, the pivot uniting the plates for scissor-like movement of the handles and blades about the pivot, the pivot being formed of a unitary piece comprising a first head lying adjacent the outer face of the first plate, a post projecting from the first head into the apertures, the post terminating in a second head lying adjacent the outer race of the second plate.

18. The hand tool of claim 17, wherein each of the tangs further includes an opening, and each of the handles further includes a shank, the shank joining the upper and lower regions of the handle through the respective opening.

19. The scissors of claim 20, wherein each of the elongated members comprises oppositely facing and spaced apart inner and outer faces and the pivot has an axial opening therein, and further wherein a fastener is received in the axial opening in engagement with the outer face of one of the elongated members to secure the elongated members together in a manner effective to control compressive force applied thereto by the pivot.

20. A pair of scissors with foldable handles having first and second opposed elongated members joined by a pivot for scissor-action of the members, each member having a blade at a front end thereof and an opposed rear tang portion, wherein each of the foldable handles is made of plastic molded onto a respective one of the tang portions, each handle comprising a shank integrally formed therewith and projecting therefrom through and conforming to an opening in the respective one of the tang portions.

21. The scissors of claim 20, wherein the pivot is made of plastic molded onto the blades and into an aperture in each of the blades.

22. The scissors of claim 20, wherein each of elongated members comprises oppositely facing and spaced apart inner and outer faces, and wherein each of the handles is molded onto a face of the tang portion of the respective member.

23. The scissors of claim 20, wherein each of elongated members comprises oppositely facing and spaced apart inner and outer faces, and wherein each of the handles is molded onto both faces of the tang portion of the respective member.

24. A method for making a pivoted hand tool of the type including a pair of first and second opposed elongated members, each member including a metal plate having a jaw at a front end portion thereof, a molded foldable handle at a rear end portion thereof, and a midportion where the members cross over each other, a pivot mounted in a central aperture formed in each of the metal plates intermediate the front and rear end portions thereof for uniting the midportions for scissor-like movement of the handles and jaws about the pivot, the pivot having a pair of first and second molded heads joined by a post extending along an axis substantially normal to the metal plates, the method comprising:

positioning into a mold first and second metal plates;

molding the foldable handles and pivot onto the metal plates using a moldable plastic, such that each of the handles is molded onto the tang of the respective metal plate to form the first and second elongated members, and the pivot is molded into the apertures; and exerting a force on the first head along the axis while retracting selected areas of the mold forming the second head to permit longitudinal displacement of the pivot and thereby impart desired clearance between the second head and the metal plate adjacent the second head, for functional operation of the tool.

* * * * *